US011576074B2

(12) United States Patent
Agrawal et al.

(10) Patent No.: US 11,576,074 B2
(45) Date of Patent: Feb. 7, 2023

(54) DYNAMICALLY CONTROLLING A LOCAL BUFFER OF A MODEM OF A WIRELESS DEVICE

(71) Applicant: Skylo Technologies, Inc., Palo Alto, CA (US)

(72) Inventors: Meghna Agrawal, Cupertino, CA (US); Yihenew Dagne Beyene, Espoo (FI); Keijo Tapio Lehtinen, Espoo (FI); Vijay Lewis, Wylie, TX (US); Andrew Nuttall, Mountain View, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 69 days.

(21) Appl. No.: 17/307,464

(22) Filed: May 4, 2021

(65) Prior Publication Data

US 2022/0312260 A1 Sep. 29, 2022

Related U.S. Application Data

(60) Provisional application No. 63/165,197, filed on Mar. 24, 2021.

(51) Int. Cl.

| | |
|---|---|
| ***H04W 28/02*** | (2009.01) |
| ***H04L 1/18*** | (2023.01) |
| ***H04L 49/90*** | (2022.01) |
| ***H04L 12/18*** | (2006.01) |
| ***H04L 49/9057*** | (2022.01) |
| ***H04L 1/1607*** | (2023.01) |

(52) U.S. Cl.

CPC ....... *H04W 28/0278* (2013.01); *H04L 1/1614* (2013.01); *H04L 1/1621* (2013.01); *H04L 1/18* (2013.01); *H04L 12/18* (2013.01); *H04L 49/9057* (2013.01); *H04L 49/9084* (2013.01)

(58) Field of Classification Search

CPC ............. H04W 28/0278; H04L 1/1614; H04L 1/1621; H04L 1/18; H04L 12/18; H04L 49/9057; H04L 49/9084

See application file for complete search history.

(56) References Cited

U.S. PATENT DOCUMENTS

| | | | | |
|---|---|---|---|---|
| 6,529,731 | B2 | 3/2003 | Modzelesky et al. | |
| 6,591,084 | B1 | 7/2003 | Chuprun et al. | |
| 7,602,743 | B2 | 10/2009 | Tang et al. | |
| 7,911,994 | B2 * | 3/2011 | Clarke | H04L 47/30 709/228 |
| 9,455,777 | B1 | 9/2016 | Johnson et al. | |

(Continued)

*Primary Examiner* — Min Jung
(74) *Attorney, Agent, or Firm* — Brian R. Short

(57) ABSTRACT

Apparatuses, methods, and systems for dynamically controlling a local buffer of a modem of a wireless device are disclosed. One method includes receiving and queuing transmission packets in the local buffer of the modem of the wireless device for wireless transmission to a receiving device, purging each transmission packet from the local buffer after receiving an acknowledgement of reception of the transmission packet from the receiving device, and requesting acknowledgement from the receiving device when a queue of the transmission packets within the local buffer exceeds a threshold level, wherein the receiving device aggregates acknowledgment responses to a plurality of unpurged transmission packets in the local buffer and transmits an aggregated acknowledgment to the modem.

20 Claims, 13 Drawing Sheets

(56) References Cited

U.S. PATENT DOCUMENTS

| | | | | |
|---|---|---|---|---|
| 9,622,259 | B2 | 4/2017 | Johnson et al. | |
| 10,175,891 | B1 * | 1/2019 | Malwankar | G06F 3/0611 |
| 10,547,374 | B1 | 1/2020 | Liu | |
| 2002/0010934 | A1 | 1/2002 | Matsuda | |
| 2006/0171418 | A1 | 8/2006 | Casini et al. | |
| 2008/0002650 | A1 * | 1/2008 | Xia | H04L 1/1628 370/389 |
| 2008/0159419 | A1 | 7/2008 | Smith et al. | |
| 2009/0061760 | A1 | 3/2009 | Barak et al. | |
| 2009/0296629 | A1 | 12/2009 | Lincoln | |
| 2014/0181288 | A1 | 6/2014 | Potkonjak | |
| 2015/0146648 | A1 * | 5/2015 | Viger | H04L 1/1685 370/329 |
| 2016/0125471 | A1 | 5/2016 | Hsu et al. | |
| 2016/0294530 | A1 | 10/2016 | Merlin et al. | |
| 2017/0085328 | A1 | 3/2017 | Dickemann, Jr. et al. | |
| 2018/0152235 | A1 | 5/2018 | Smoot et al. | |
| 2018/0234289 | A1 * | 8/2018 | Chen | H04L 1/18 |
| 2018/0359811 | A1 | 12/2018 | Verzun et al. | |
| 2018/0376374 | A1 * | 12/2018 | Trainin | H04W 28/085 |
| 2018/0376393 | A1 | 12/2018 | Wu et al. | |
| 2019/0379448 | A1 | 12/2019 | Markovitz et al. | |
| 2020/0119808 | A1 | 4/2020 | Parr | |
| 2020/0145922 | A1 * | 5/2020 | Agrawal | H04L 1/188 |
| 2021/0111836 | A1 * | 4/2021 | Huang | H04L 1/1642 |

* cited by examiner

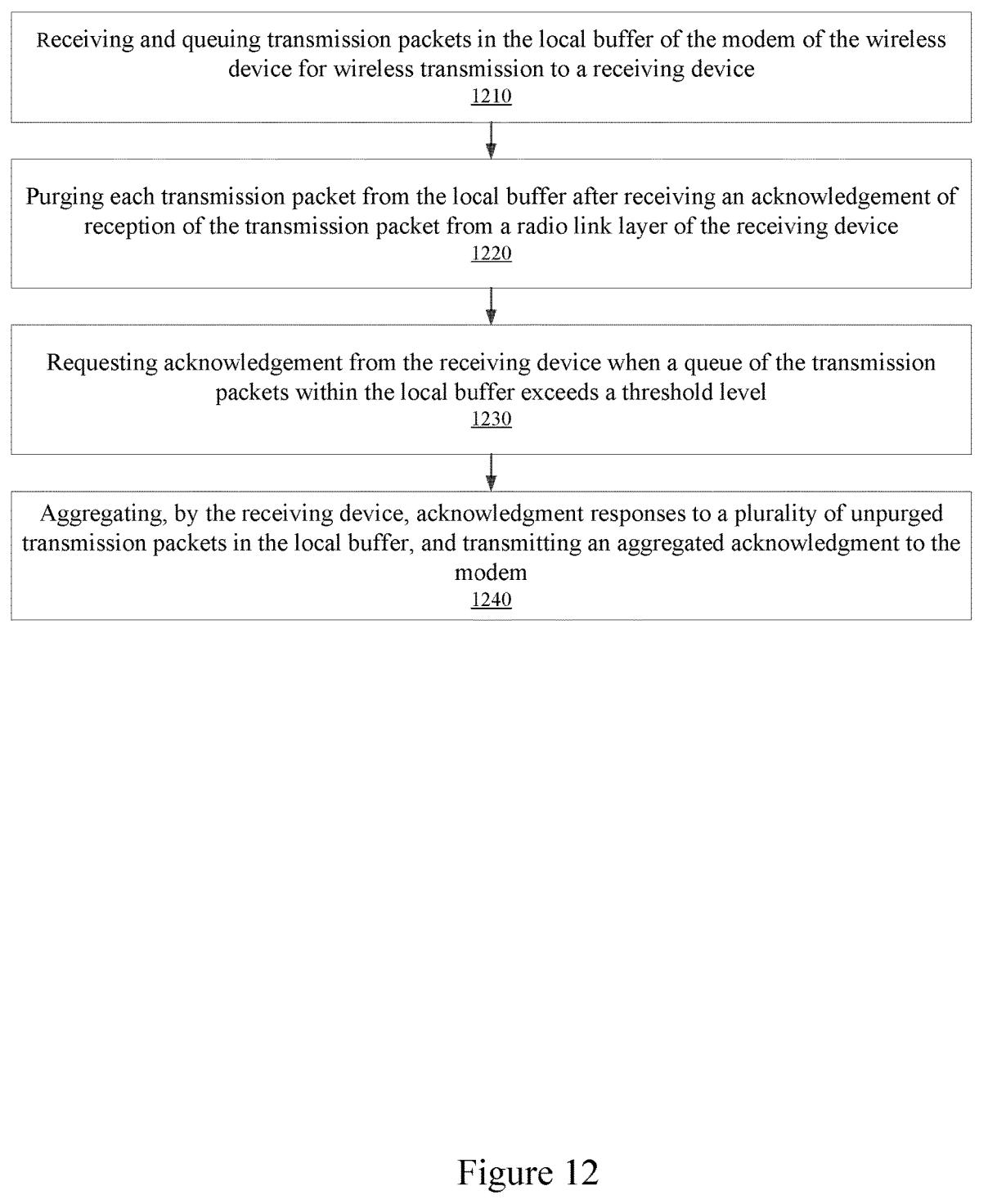

Receiving and queuing transmission packets in the local buffer of the modem of the wireless device for wireless transmission to a receiving device
1210

Purging each transmission packet from the local buffer after receiving an acknowledgement of reception of the transmission packet from a radio link layer of the receiving device
1220

Requesting acknowledgement from the receiving device when a queue of the transmission packets within the local buffer exceeds a threshold level
1230

Aggregating, by the receiving device, acknowledgment responses to a plurality of unpurged transmission packets in the local buffer, and transmitting an aggregated acknowledgment to the modem
1240

Figure 12

DYNAMICALLY CONTROLLING A LOCAL BUFFER OF A MODEM OF A WIRELESS DEVICE

RELATED PATENT APPLICATIONS

This patent application claims priority to Provisional Patent Application Ser. No. 63/165,197 filed Mar. 24, 2021, which is herein incorporated by reference.

FIELD OF THE DESCRIBED EMBODIMENTS

The described embodiments relate generally to wireless communications. More particularly, the described embodiments relate to systems, methods and apparatuses for dynamically controlling a local buffer of a modem of a wireless device.

Background

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such a GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for dynamically controlling a local buffer of a modem of a wireless device.

Summary

An embodiment includes a method of dynamically controlling a local buffer of a modem of a wireless device. The method includes receiving and queuing transmission packets in the local buffer of the modem of the wireless device for wireless transmission to a receiving device, purging each transmission packet from the local buffer after receiving an acknowledgement of reception of the transmission packet from the receiving device, and requesting acknowledgement from the receiving device when a queue of the transmission packets within the local buffer exceeds a threshold level, wherein the receiving device aggregates acknowledgment responses to a plurality of unpurged transmission packets in the local buffer and transmits an aggregated acknowledgment to the modem.

Another embodiment includes a modem, wherein the modem includes a local buffer, an RF wireless communication chain, and a controller. The controller is operative to receive and queue packets in the local buffer for wireless transmission through the RF wireless communication chain to a receiving device, purge each transmission packet from the local buffer after receiving an acknowledgement of reception of the transmission packet from the receiving device, and request acknowledgement from the receiving device when a queue of the transmission packets within the local buffer exceeds a threshold level, wherein the receiving device aggregates acknowledgment responses to a plurality of unpurged transmission packets in the local buffer and transmits an aggregated acknowledgment to the modem.

Another embodiment includes a wireless system. The wireless system includes a base station including a receiver, and a hub operative to report information to the base station, the hub. The hub includes a local buffer, an RF wireless communication chain, and a controller. The controller is operative to receive and queue packets in the local buffer for wireless transmission through the RF wireless communication chain to the base station, purge each transmission packet from the local buffer after receiving an acknowledgement of reception of the transmission packet from the base station, and request acknowledgement from the receiving device when a queue of the transmission packets within the local buffer exceeds a threshold level. The base station is operative to aggregate acknowledgment responses to a plurality of unpurged transmission packets in the local buffer and transmits an aggregated acknowledgment to the hub.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 12 is a flow chart that includes steps of a method of dynamically controlling a local buffer of a modem, according to an embodiment.

DETAILED DESCRIPTION

Figure 1:
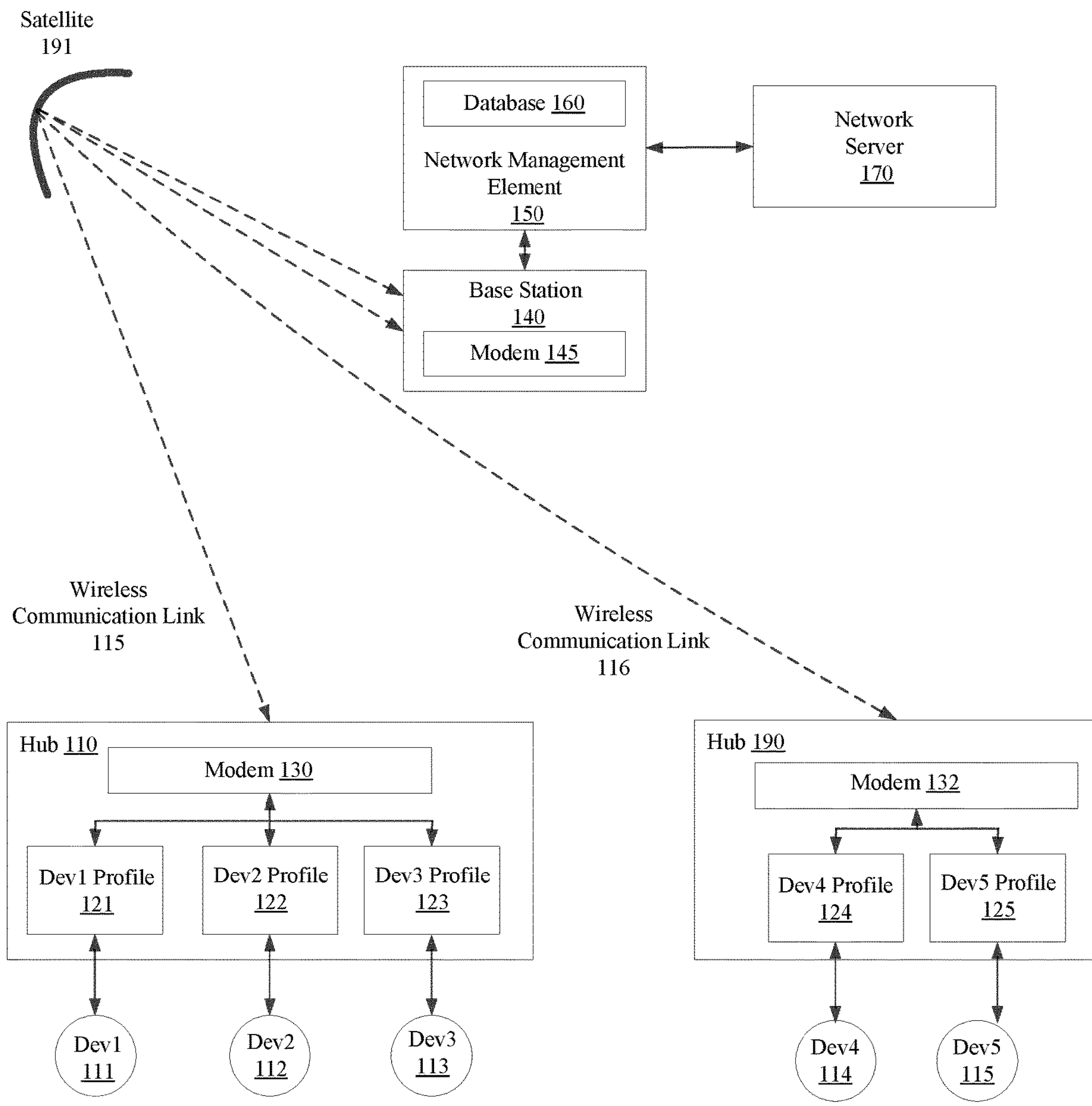
FIG. 1 shows a plurality of hubs that communicate data of data sources through a satellite link to a base station, according to an embodiment.

The embodiments described include methods, apparatuses, and systems for dynamically controlling a local buffer of a modem. At least some embodiments include the modem requesting acknowledgement from the receiving device when a queue of the packets within the local buffer exceeds a threshold level or when the queue of the packets within the local buffer includes a high priority packet. Further, for at least some embodiments, the receiving device aggregates acknowledgements, and simultaneously transmits the aggregated acknowledgments.

For some embodiments of a standard radio link control (RLC) of a modem, an RLC mechanism sends polling requests (request for acknowledgement of reception of packets) based on the standard defined timer expiration. When no new data (packets) is received within a threshold time or no new data is required to be transmitted, the radio link layer sends a polling request (request for acknowledgment) to a receiver that is to have received the transmitted packets. In the case of IoT (internet of things), applications transmit a burst of data (packets) periodically (for example, every 5 minutes). Therefore, an RLC polling request (request for acknowledgement) after every data (packet) transmission reduces the wireless transmission channel capacity.

For at least some embodiments of the 3GPP (3rd Generation Partnership Project) NB-IoT (Narrow Band Internet of Things) specification, both uplink (UL) and downlink (DL) data transmissions are handled through RLC AM (radio link control-acknowledged mode). That means that each RLC SDU (service data unit) is acknowledged by the RLC peer on the receiving side.

Despite its benefits in ensuring successful delivery of data packets, the ARQ (automatic repeat request) mechanism of the RLC AM (Acknowledge Mode) protocol incurs a huge overhead especially on the DL resources which are relatively scarce compared to the UL. This is because, in addition to unicast DL data transmission, the DL resources are also used for the transmission of broadcast messages, multicast messages as well as the grants for UL and DL data. At least some of the described embodiments provide an alternative modification to the RLC AM protocol which reduces the RLC AM overhead. Generally. IoT devices send infrequent small pieces of data. An acknowledgement after every data (packet) requires a large amount of overhead and reduces wireless channel resources by 30 to 50%. At least some of the described embodiments reduce the transmitted acknowledgements by not requesting for acknowledgment after every packet, thereby increasing capacity. However, for at least some embodiments, if a high priority packet is received, then an acknowledgement may be requested immediately.

At least some embodiments include a wireless communication system wherein a radio link layer of the wireless communication system maintains a window of N unacknowledged packets, transmits new packets received from an upper layer based on the number of unacknowledged packets in a local buffer, sends polling request (request for acknowledgement) along with the new packet based on the quality of service required for the transmit packet or when number of unacknowledged packets exceed a threshold configured by the upper layer or application.

For an embodiment, an interface is created between an application and wireless communication system to indicate the data reliability requirement of the data. When the data is marked as high reliability data, the radio link layer can immediately send the polling request (request for acknowledgement) along with the data (packet(s)). After receiving the polling request, the receiver can send the RLC status message (response to request for acknowledgement) without waiting for a packet in the reverse direction. For an embodiment, an application layer triggers the polling request (request for acknowledgement) for previously transmitted packets even when there is no new data to be transmitted. In addition to this, the application layer can also configure a RLC policy for the wireless communication system which includes 'Unacknowledged packet (referred as N_POLL_WAIT) threshold to trigger polling request by the radio link layer. For an embodiment, an interface is added between the application layer and wireless control system to obtain an RLC window status (includes at least the number of acknowledged packets).

For at least some embodiments, the receiver of the radio link layer maintains a buffer of packets for which an acknowledgement has not transmitted by the receiver and opportunistically sends a status report when a packet in reverse direction is transmitted by the receiver. For an embodiment, the receiver of the radio link layer maintains only a fixed number of packets for which an acknowledgement is not sent. If the number of packets for which an acknowledgement is not sent exceeds a threshold, the receiver can send a status message (including the acknowledgement for the received packets) to the transmitter.

FIG. 1 shows a plurality of hubs 110 190 that communicate data of data sources 111, 112, 113, 114, 115 through a satellite link (through satellite 191) to a base station 140, according to an embodiment. For an embodiment, a network provider server 170 operates to generate scheduling of the wireless communication between the base station 140 and the plurality of hubs 110, 190 through wireless links 115, 116. For an embodiment, the network provider server 170 may access a database 160 of, for example, a network management element 150, aid in generating the schedule communication, and provide the scheduled communication to the base station 140. For an embodiment, the scheduled communication includes allocating frequency and time slots for both uplink and downlink wireless communication. For an embodiment, the base station 140 includes a modem 145 and the hubs 110, 190 include modems 130, 132, for enabling the wireless communication between the base station 140 and the hubs 110, 190.

It is to be understood that the data sources 111, 112, 113, 114, 115 can vary in type, and can each require very different data reporting characteristics. The wireless satellite links 116, 117 links are a limited resource, and the use of this limited resource should be judicious and efficient. In order to efficiently utilize the wireless satellite links 116, 117, each of the data sources 111, 112, 113, 114, 115 are provided with data profiles (shown as Dev profiles as a profile may be allocated for each device) 121, 122, 123, 124, 125 that coordinate the timing (and/or frequency) of reporting (communication by the hubs 110, 190 to the base station 140 through the wireless satellite links 116, 117) of the data provided by the data sources 111, 112, 113, 114, 115.

For an embodiment, a network management element 150 maintains a database 160 in which the data profiles 121, 122, 123, 124, 125 can be stored and maintained. Further, the network management element 150 manages the data profiles 121, 122, 123, 124, 125, wherein the management includes ensuring that synchronization is maintained during the data reporting by the hubs 110, 190 of the data of each of the data sources 111, 112, 113, 114, 115. That is, the data reported by each hub 110, 190 of the data of the data sources 111, 112, 113, 114, 115 maintains synchronization of the data reporting of each of the data sources 111, 112, 113, 114, 115 relative to each other. Again, the network management element 150 ensures this synchronization through management of the data profiles 121, 122, 123, 124, 125. The synchronization between the data sources 111, 112, 113, 114, 115 distributes the timing of the reporting of the data of each of the data sources 111, 112, 113, 114, 115 to prevent the reporting of one device from interfering with the reporting of another device, and provides for efficiency in the data reporting.

Figure 2:
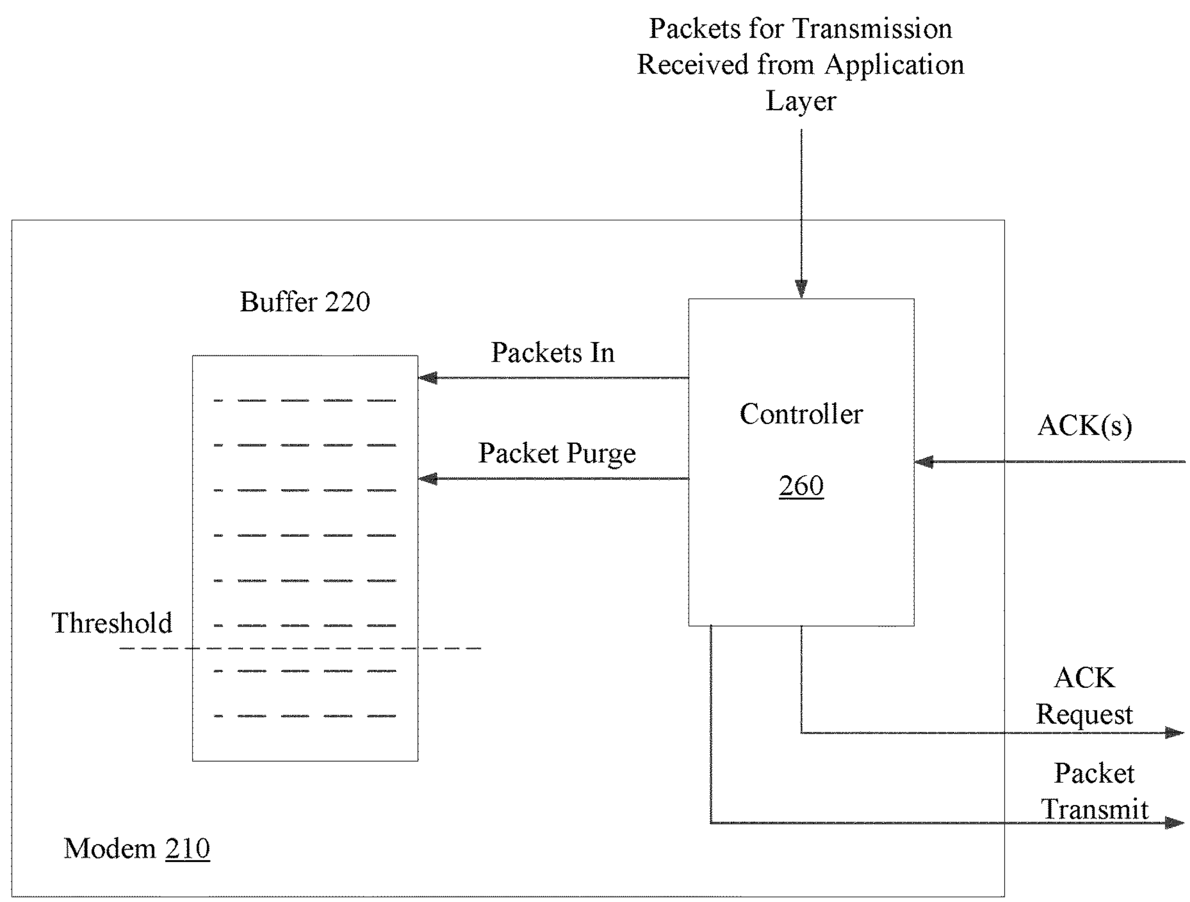
FIG. 2 shows a modem, according to an embodiment.

FIG. 2 shows a modem 210, according to an embodiment. The modem 210 includes a controller 260 and a local buffer 220. For an embodiment, the local buffer 220 is a buffer of a radio link layer of the modem 210. For an embodiment, the modem is included within the hubs 110, 190.

For an embodiment, the modem 210 receives packets for transmission to another wireless device (receiving wireless device, which for an embodiment is the base station 140). A controller 260 of the modem 210 operates to store the packets in the local buffer 220, and further operates to transmit the packets. For an embodiment, the controller 260 of the modem 210 maintains the packets in the local buffer 220 until the modem 210 receives confirmation that the packets have been successfully received by the base station after having been wirelessly transmitted through wireless communication links 115, 116. For an embodiment, the success determination includes the controller transmitting an acknowledgment (ACK) request to the receiving device. For an embodiment, the receiving device replies with an acknowledgement (ACK) indicating whether a packet(s) have been successfully received. For an embodiment, once the controller 260 of the modem 210 receives an ACK that indicates that a packet was successfully received, the controller 260 of the modem 210 purges the successfully received packet(s) from the local buffer 220.

For an embodiment, a threshold is set which determines when an ACK request is transmitted. That is, for an embodiment, the controller 260 of the modem 210 transmits an ACK request when the controller 260 of the modem 210 has stored more than a threshold number of packets in the local buffer 220. As ACKs are received by the controller 260 of the modem 210, the controller 260 of the modem 210 purges the acknowledged packets from the local buffer 220.

For at least some embodiments, the threshold for different wireless devices (such as, hubs) can be different for different wireless devices. For an embodiment, the threshold(s) are preset. For an embodiment, the threshold for each local buffer of each modem of each wireless device is adjustable. For an embodiment, the threshold for each local buffer of each modem of each wireless device is dynamically adjustable over time. For an embodiment, the threshold for each local buffer of each modem of each wireless device is dynamically adjustable over time based on the type of wireless device, a product type of the wireless device, and/or based on a customer of the wireless device. For an embodiment, the threshold for each local buffer of each modem of each wireless device is dynamically adjustable over time based on a desired or required quality of service (QoS) for wireless communication of the wireless device. For an embodiment, the threshold for each local buffer of each modem of each wireless device is dynamically adjustable over time based on application data types being used by the wireless device. That is, different types of data may require different levels of QoS, and accordingly, the threshold can be accordingly selected. For an embodiment, the threshold for each local buffer of each modem of each wireless device is dynamically adjustable over time based on network conditions of the wireless device. For a higher QoS, the modem adjusts the threshold towards a lower threshold, and for a lower QoS, the modem adjusts the threshold towards a greater threshold. For a data type that requires a faster response, the modem adjusts the threshold to a lower threshold, and for a data type that does not require a fast response, the modem can adjust the threshold to a higher threshold. When the network of the wireless device of the modem is suffering from greater congestion (due to, for example, high data traffic) the modem can adjust the threshold to a higher threshold, and when the network is not suffering from congestion, the modem can adjust the threshold to a lower level. For an embodiment, a higher level of QoS service, the modem adjusts the threshold towards 0, and for a lower QoS service, the modem adjusts the threshold tend towards infinity. For an embodiment, the network of the wireless device can also capitalize on excess capacity by temporally trending device thresholds towards zero to improve their QoS during off peak hours, as detected by the base station/core network/local modem. For an embodiment, a central or network service selects the threshold of each of the local buffers of each of the modems of each of the wireless devices of the wireless network. Further, for an embodiment, a level of effort a hub will extend (for example, packet transmission retries) when re-transmitting unacknowledged packets is based upon network congestion and QoS.

For an embodiment, the threshold level is dynamically determined by the receiving device (base station) based upon its network congestion. For example, if the base station determines that 60% of random-access slots are in use and 50% of transmit blocks are available, the base station can decrease the threshold, resulting in a QoS increase for all/a set of hubs and base station usage to increase to 80%. If usage goes past 90% and the base station starts to saturate, then the base station may increase the threshold.

For an embodiment, the threshold level is determined by a network server, or the base station, and is communicated back to the hubs. For an embodiment, the base station communicates the threshold level to the hubs (transmitting devices) through broadcast/multicast for entire network swaths or customer accounts. Can also be done un-ideally on a per hub basis.

Figure 3:
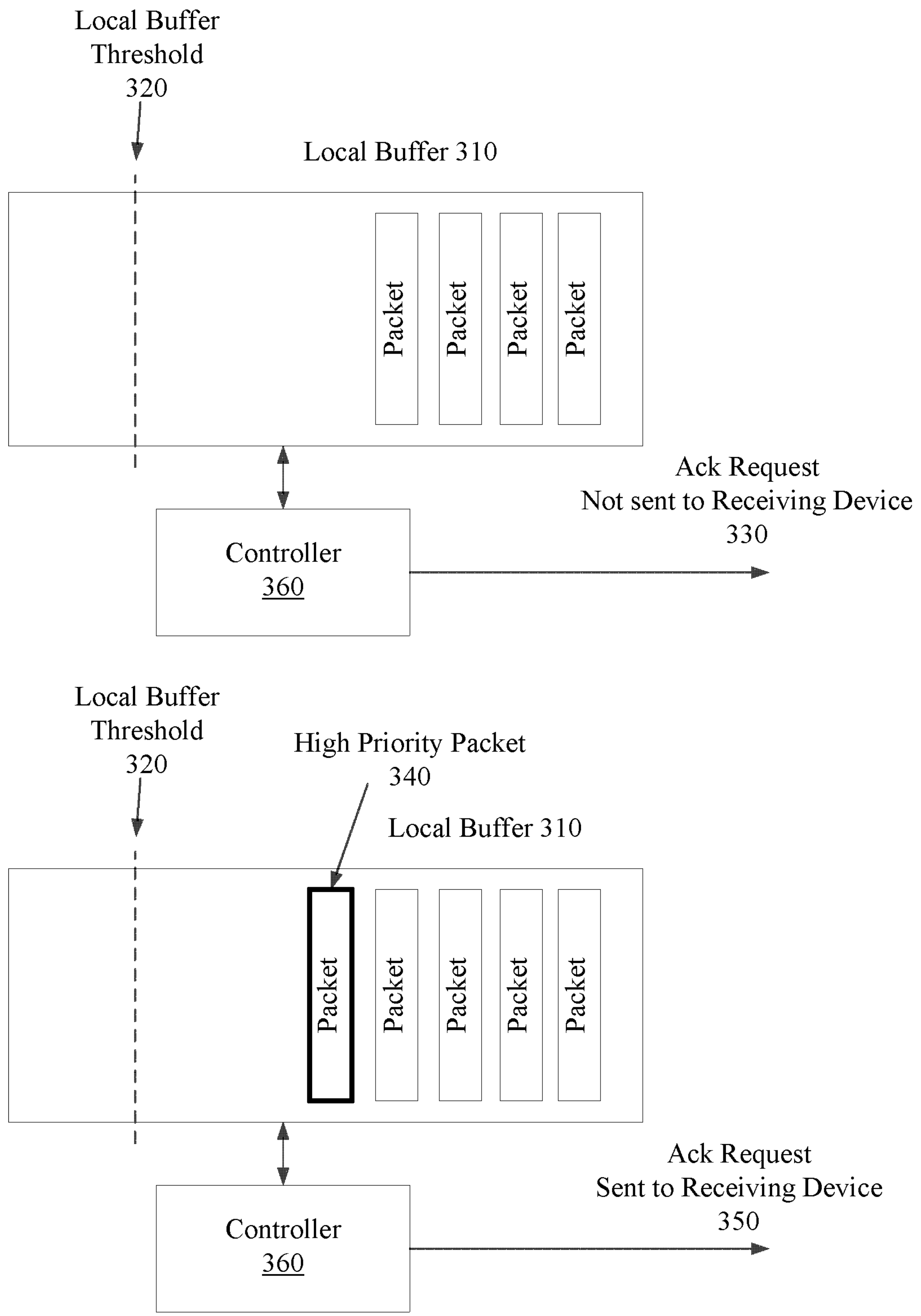
FIG. 3 shows a controller of a modem requesting acknowledgment of reception of packets based on a local buffer of the modem having a high-priority packet, according to an embodiment.

FIG. 3 shows a controller 360 of a modem requesting acknowledgment of reception of packets based on a local buffer 310 of the modem having a high-priority packet 340, according to an embodiment. As shown in FIG. 3, when the number of packets within the local buffer 310 is below a previously described threshold 320, for an embodiment, an ACK request 330 is not transmitted. However, if the local buffer 310 receives (has stored in the local buffer 310) a high-priority packet 340, the controller 360 transmits an ACK request 350. For an embodiment, a packet is designated as a high-priority packet 340 when the packet is determined to a have a temporal urgency.

The desire is to minimize or reduce the number of interactions between the transmitting device and the receiving device, which reduces the demand on the wireless channel between the transmitting device and the receiving device. This is the reasoning behind only transmitting an ACK request when the number of packets received has reached the threshold number, and the ACK can include information relating to some or all the packets stored in the local buffer 310. However, some packets have a time urgency and need to have an ACK more quickly. Therefore, as described, an embodiment includes the controller 360 transmits an ACK request 350 upon storing a high-priority packet 340 in the local buffer 310.

Figure 4:
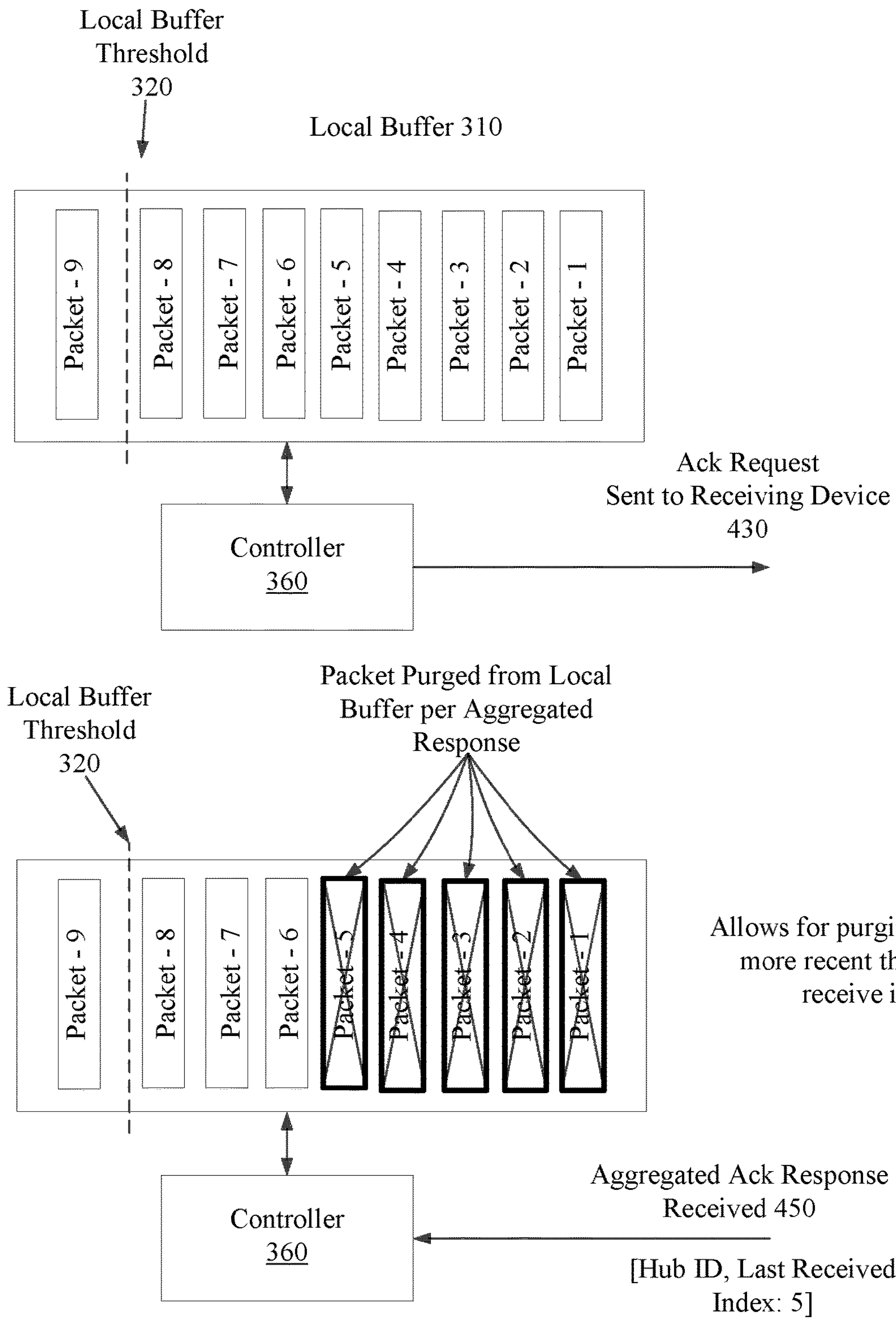
FIG. 4 shows a controller of a modem requesting acknowledgment of reception of packets based on a local buffer of the modem having greater than a threshold number of packets, and the modem purging packets based on an aggregated acknowledgment, according to another embodiment.

FIG. 4 shows a controller 360 of a modem requesting acknowledgment of reception of packets based on a local buffer 310 of the modem having greater than a threshold 320 number of packets, and the modem purging packets based on an aggregated acknowledgment, according to another embodiment. As shown, in response to the ACK request 430, the receiving device (such as, a base station) replies (transmits back) an aggregated ACK 450 that includes information that allows the controller to determine which packets have been successfully received. For an embodiment, as shown, the aggregated ACK 450 includes a hub ID (that is, an identification of the transmitting device, such as, a hub) and a last packet index of a received set of contiguous packets starting with the first packet in the local buffer. As shown in FIG. 4, the aggregated ACK response includes an index of 5, thereby indicating that all packets up to packet index 5 have been successfully received.

For an embodiment, once the controller 360 receives the aggregated ACK 450, the controller 360 proceeds to purge the local buffer 310 of the successfully received packets. For example, for the aggregated ACK 450 of FIG. 4, the controller 360 proceeds to purge the local buffer 310 of the successfully received packets 1 through 5.

Figure 5:
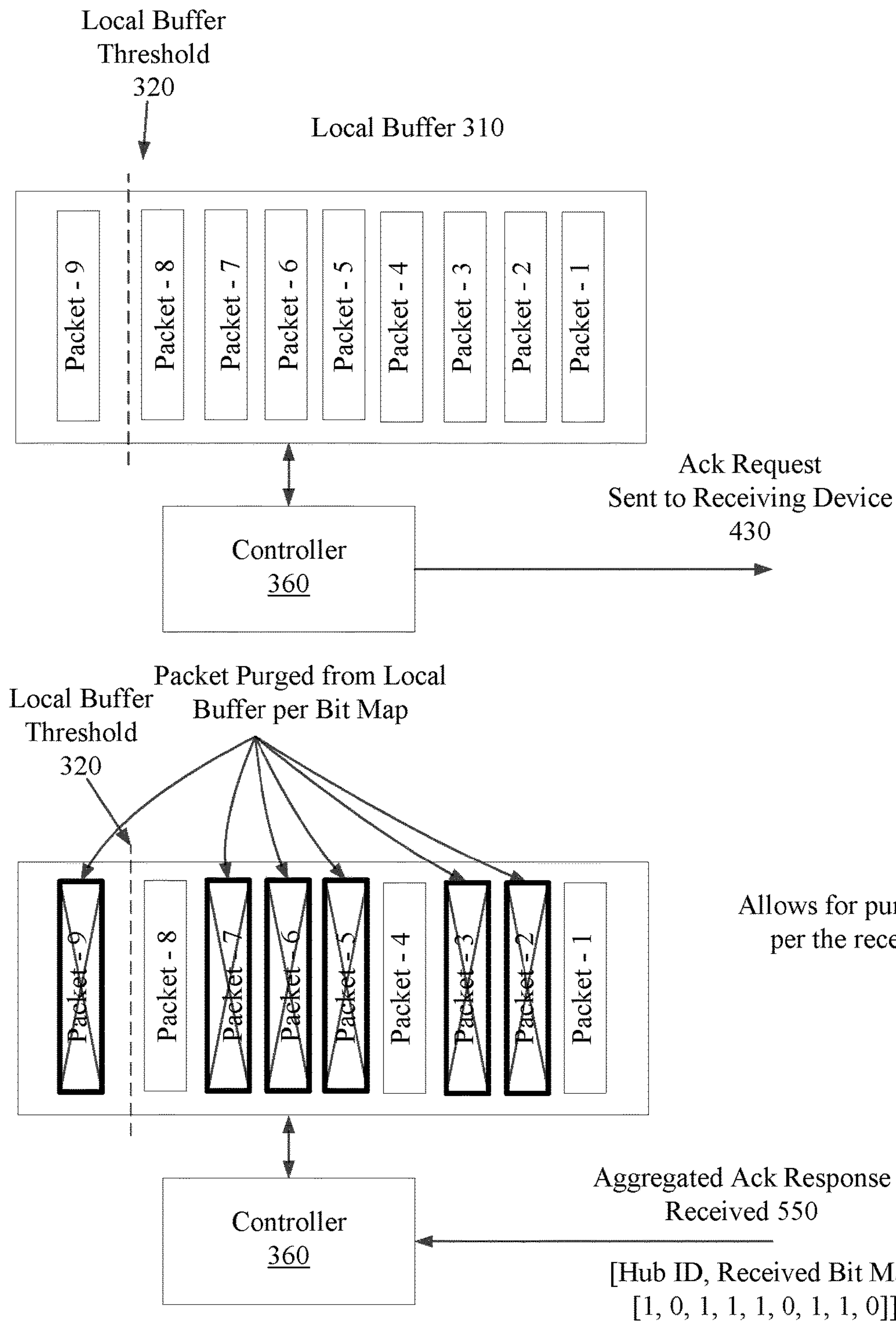
FIG. 5 shows a controller of a modem requesting acknowledgment of reception of packets based on a local buffer of the modem having greater than a threshold number of packets, and the modem purging packets based on an aggregated acknowledgment, according to an embodiment.

FIG. 5 shows a controller of a modem requesting acknowledgment 430 of reception of packets based on a local buffer 310 of the modem having greater than a threshold number of packets, and the modem purging packets based on an aggregated acknowledgment, according to an embodiment. As shown, in response to the ACK request 430, the receiving device (such as, a base station) replies (transmits back) an aggregated ACK 550 that includes information that allows the controller to determine which packets have been successfully received. For an embodiment, as shown, the aggregated ACK 550 includes a hub ID (that is, an identification of the transmitting device, such as, a hub) and a received bitmap that includes bits that indicate whether a packet was successfully received. For example, a bit of 1 may indicate successful reception, and a bit of 0 may indicated a non-successful reception.

For an embodiment, once the controller 360 receives the aggregated ACK 550, the controller proceeds to purge the local buffer 310 of the successfully received packets. For example, for the aggregated ACK 550 of FIG. 5, the controller 360 proceeds to purge the local buffer 310 of the successfully receive packets 2, 3, 5, 6, 7, 9. For this example, the local buffer includes a possible 10 transmission packets, and each of the 10 possible packets are identified by 10 different bit placements.

Figure 6:
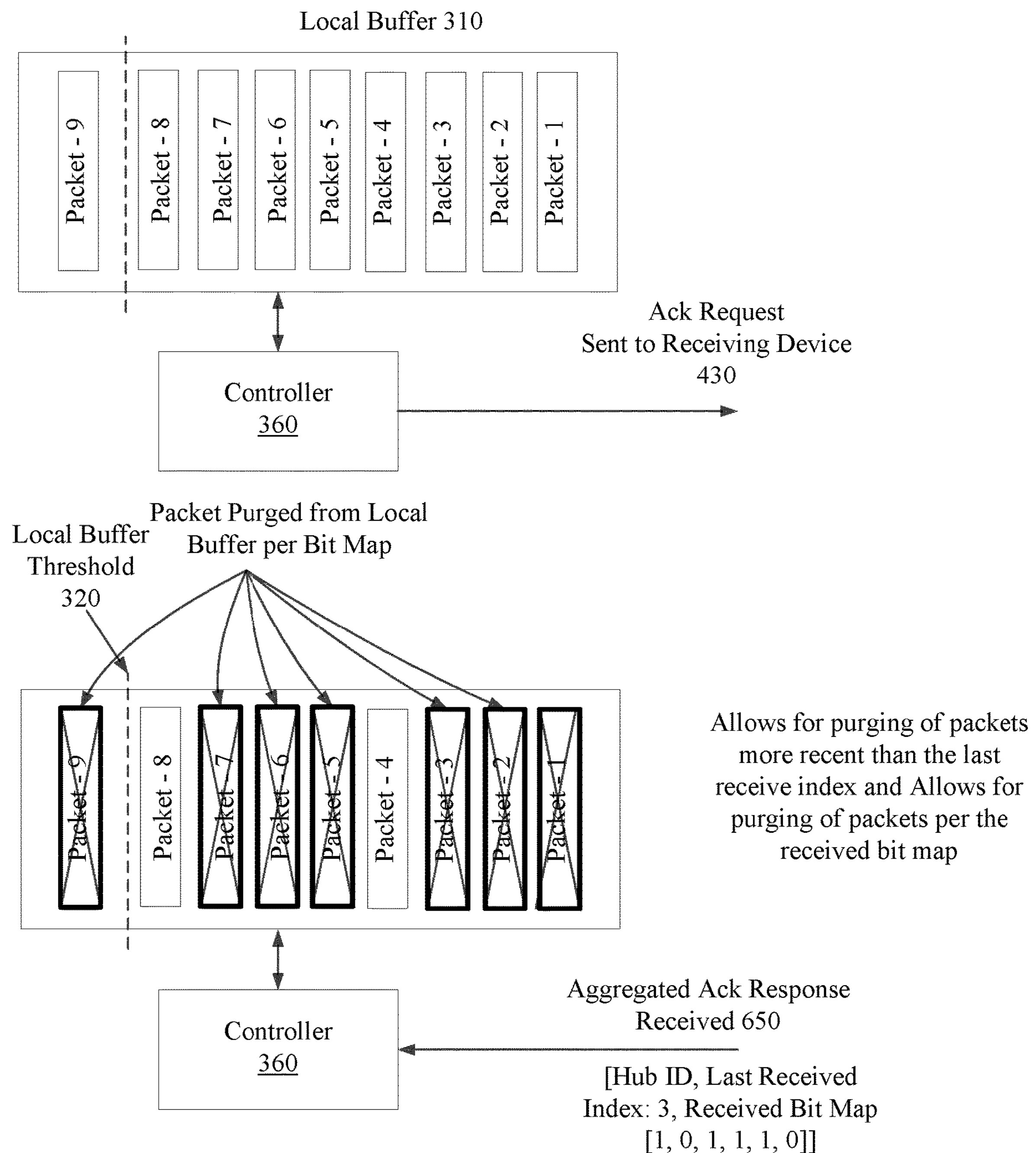
FIG. 6 shows a controller of a modem requesting acknowledgment of reception of packets based on a local buffer of the modem having greater than a threshold number of packets, and the modem purging packets based on an aggregated acknowledgment, according to an embodiment.

FIG. 6 shows a controller of a modem requesting acknowledgment of reception of packets based on a local buffer of the modem having greater than a threshold number of packets, and the modem purging packets based on an aggregated acknowledgment 650, according to an embodiment. This embodiment includes a combination of the aggregated ACK including a hub ID (that is, an identification of the transmitting device, such as, a hub) and a last packet receive index as shown in FIG. 4, and the aggregated ACK including a hub ID (that is, an identification of the transmitting device, such as, a hub) and a received bitmap that includes bits that indicate whether a packet was successfully received as shown in FIG. 5.

The hub then purges the local buffer of transmission packets according to the last packet received index and the received bitmap of the aggregated acknowledgment.

Figure 7:
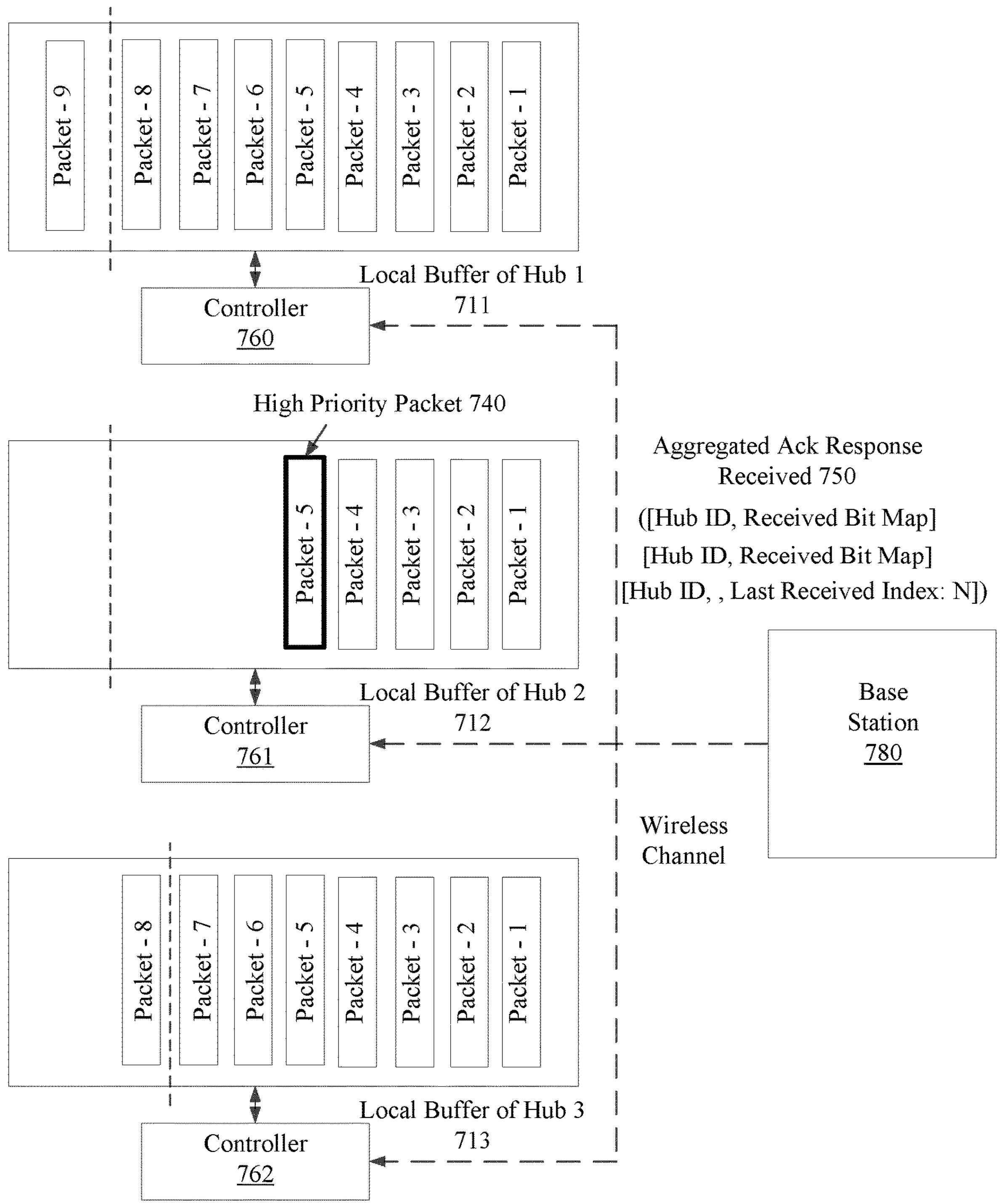
FIG. 7 shows a plurality of hubs receiving an aggregated response from a base station that includes hub identifiers and bitmap of packet reception success, according to an embodiment.

FIG. 7 shows a plurality of hubs receiving an aggregated acknowledgement from a base station 780 that includes hub identifiers and bitmap of packet reception success, according to an embodiment. The first hub includes a controller 760 and a local buffer 711. The second hub includes a controller 761 and a local buffer 712. The third hub includes a controller 762 and a local buffer 713. As shown, for this embodiment, the local buffer 711 of the first hub has enough transmission packets to exceed the threshold, and a request for acknowledgement was sent. Further, the local buffer 712 of the second hub includes a high priority packet 740, and a request for acknowledgement was sent. Further, the local buffer 713 of the third hub has enough transmission packets to exceed the threshold, and a request for acknowledgement was sent.

As shown, for an embodiment, the aggregated acknowledgement 750 generated by the base station 780 that received the request for acknowledgments, includes a hub ID and a received bitmap for each of the first hub, and the second hub, and a bit map and last index for the third hub. Each hub identifies the bitmap or last index intended for the hub based on the Hub ID. Further, each hub determines which packets within its local buffer were successfully received based on the corresponding received bitmap or last index. As previously described, for an embodiment, each bit of the bitmap provides an indicator to the hub whether a corresponding packet within the local buffer of the hub has or has not been successfully received by the base station 780.

Figure 8:
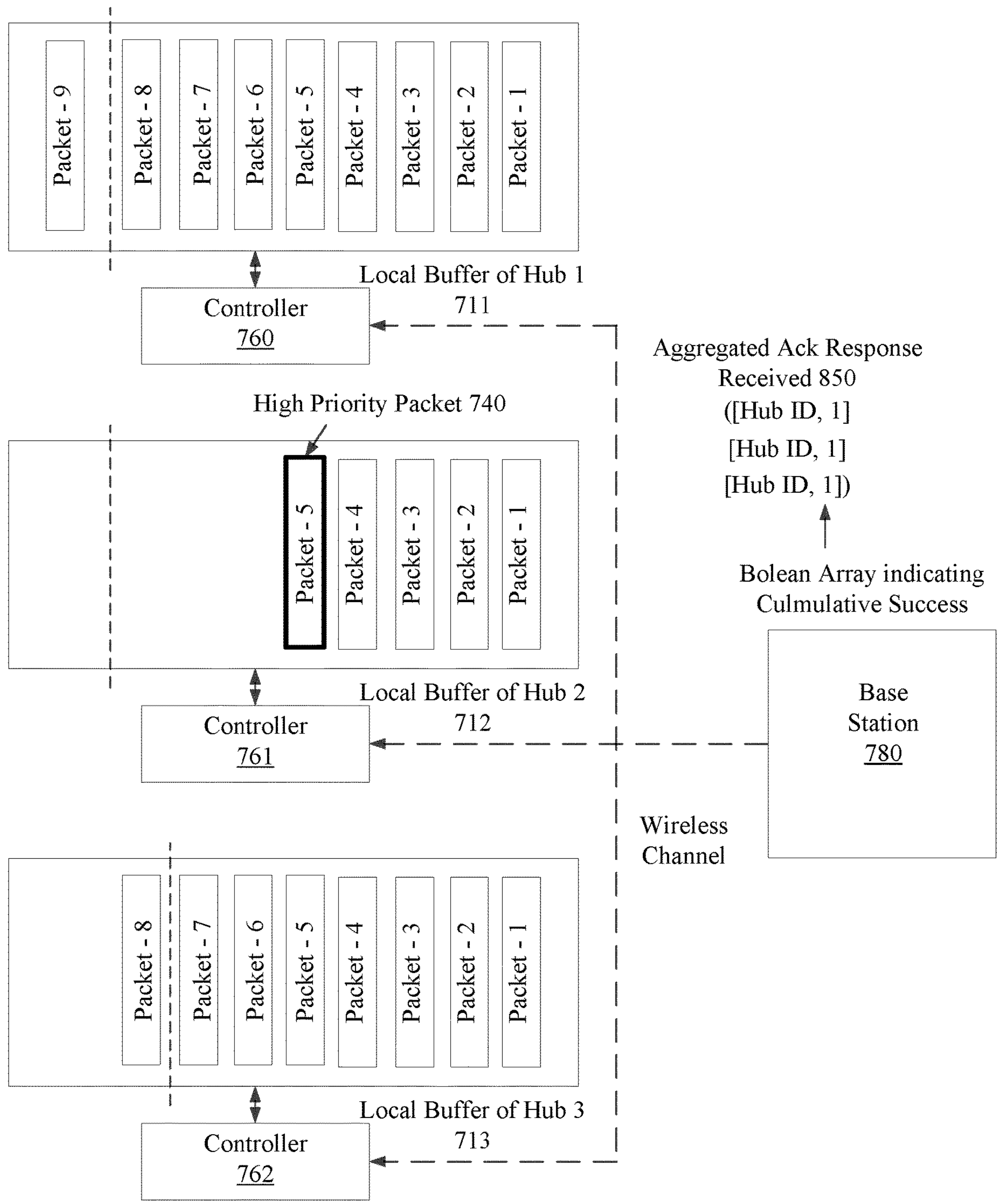
FIG. 8 shows a plurality of hubs receiving an aggregated acknowledgement from a base station that includes hub identifiers and a Boolean array indicating packet reception success, according to an embodiment.

FIG. 8 shows a plurality of hubs receiving an aggregated 850 from a base station that includes hub identifiers and a Boolean array indicating packet reception success, according to an embodiment. For an embodiment, the Boolean array indicates cumulative success in reception of transmitted packets from each of the identified hubs. For an embodiment, the Boolean array is an array of acknowledgments for multiple hubs. For an embodiment, each index in the array represents the response to an individual hub. For each hub, the Boolean array specifies if the receiving device (such as, a base station) had a 100% data delivery reliability of the received data packets of the wireless device or if the receiving device did not have a 100% data delivery reliability of the received data packets. This type of acknowledgement could be combined with the previous types like bitmaps for the Boolean values which are 0.

Figure 9:
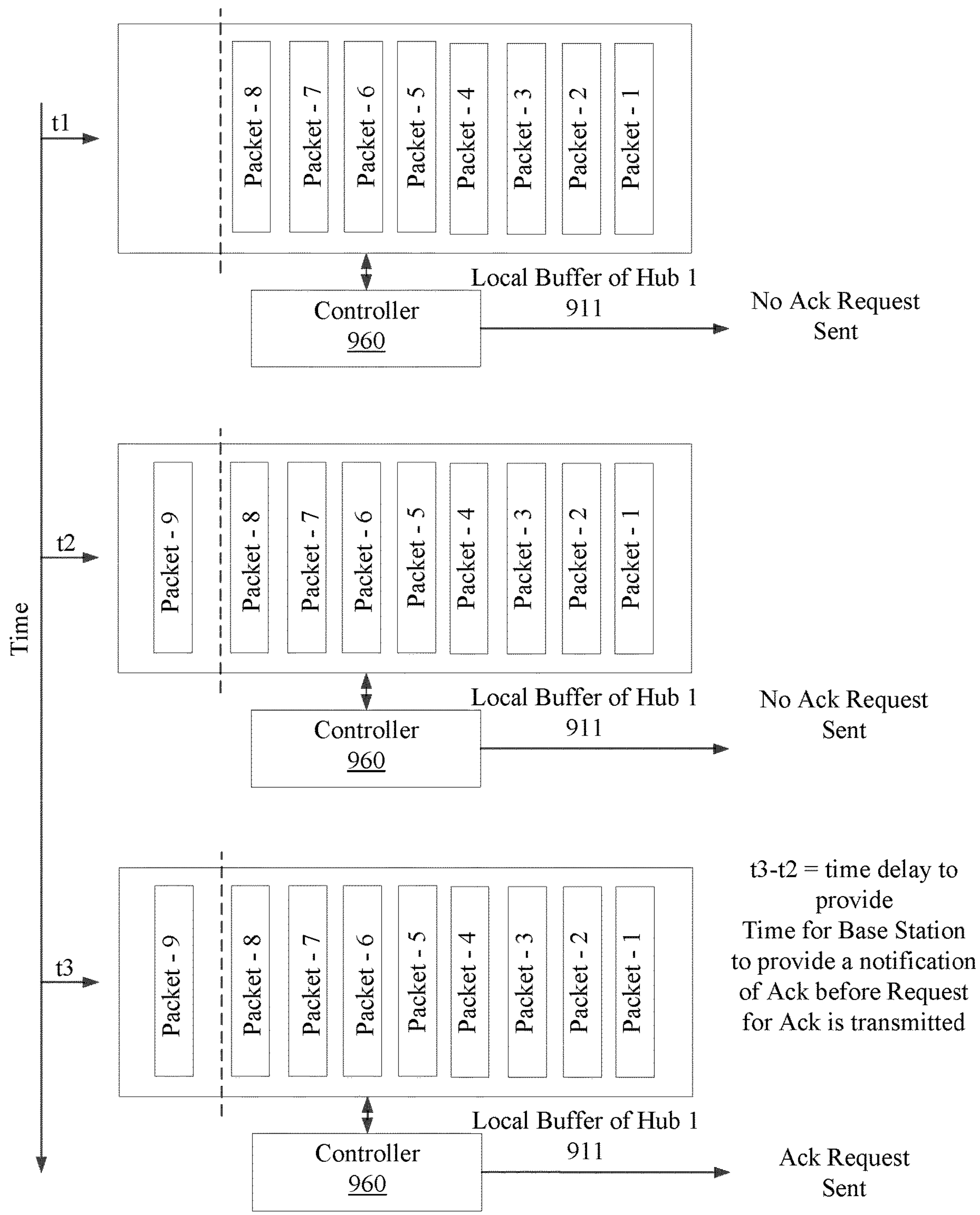
FIG. 9 shows a controller of a hub that delays transmission of an acknowledgement request to allow a base station time to potentially transmit an aggregated acknowledgement notice before the hub transmits an acknowledgment request, according to an embodiment.

FIG. 9 shows a controller 960 of a hub that delays transmission of an acknowledgement request to allow a base station time to potentially transmit an aggregated acknowledgement notice before the hub transmits an acknowledgment request, according to an embodiment. FIG. 9 includes a timeline of conditions of the hub. At a first time t1 the local buffer 911 of the hub includes less than the threshold number of packets, and therefore, the controller 960 does not transmit a request for acknowledgement to the base station. At a second time t2 the threshold number of packets within the local buffer 911 exceeds the threshold. For at least some embodiments a request for acknowledgment would be transmitted. However, for this embodiment, a time delay is introduced before the controller 960 transmits the request for acknowledgment. At a third time t3 the request for acknowledgement is transmitted. The introduced time delay in this example is the difference in time between the third time t3 and the second time 2. As described and shown in FIG. 10, the introduced delay provides an opportunity for the base station to transmit an aggregated acknowledgement notice that includes acknowledgements of successfully received packets which can preempt the sending of request for acknowledgments by the hub.

For an embodiment, the introduced time delay is based upon a round trip (or propagation) communications delay time between the transmitting device (hub) and the receiving device (base station). For an embodiment, the introduced time delay is based upon the timing of scheduled multicast transmission as shown and described by FIG. 13.

Figure 10:
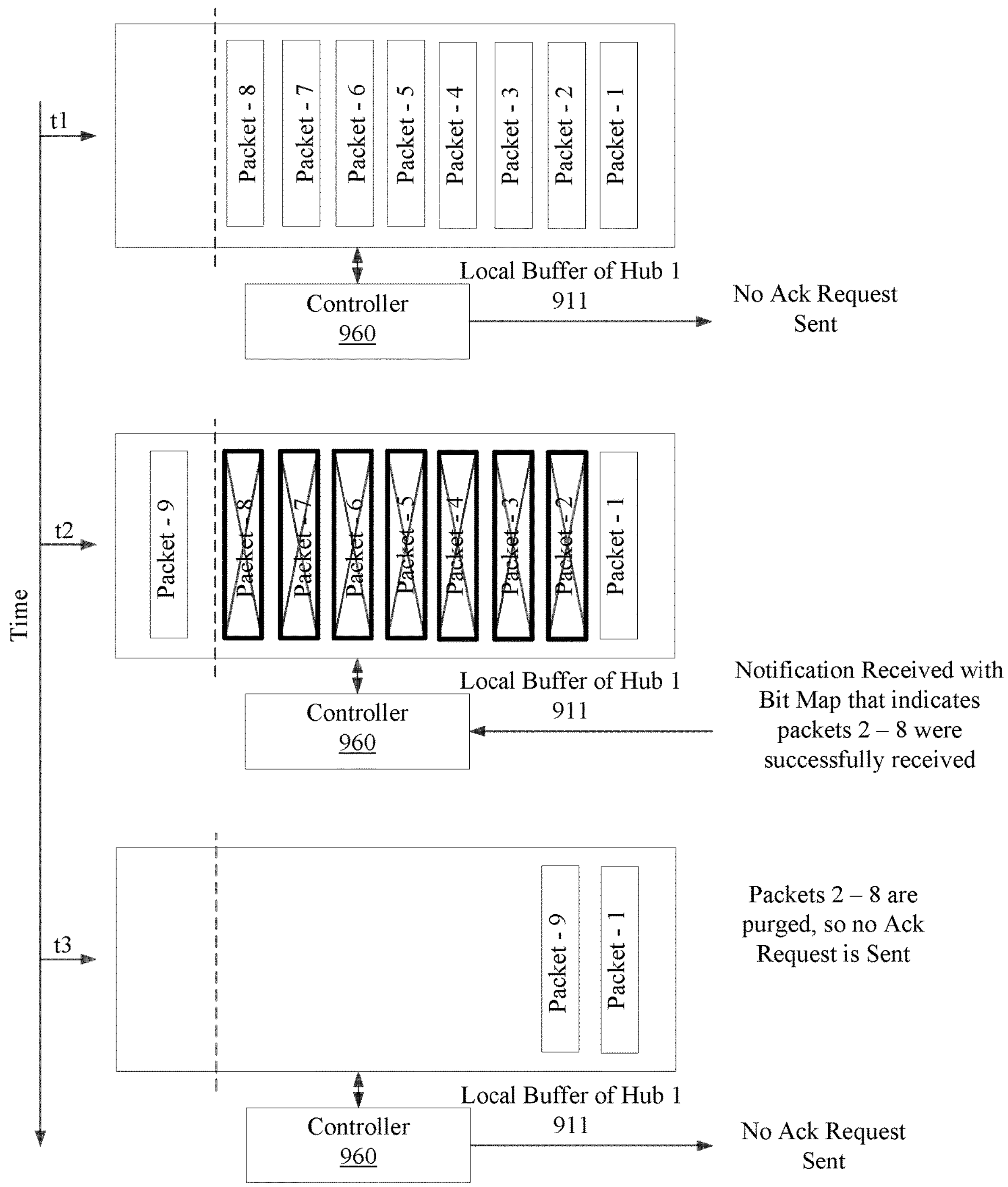
FIG. 10 shows a controller of a hub that delays transmission of an acknowledgement request, receives an aggregated acknowledgement notice, and accordingly purges packets from a local buffer of the hub, according to an embodiment.

FIG. 10 shows a controller 960 of a hub that delays transmission of an acknowledgement request, receives an aggregated acknowledgement notice, and accordingly purges packets from a local buffer 911 of the hub, according to an embodiment. At a first time t1 the local buffer 911 of the hub include less than the threshold number of packets, and therefore, the controller 960 does not transmit a request for acknowledgement to the base station. At a second time t2 the threshold number of packets within the local buffer 911 exceeds the threshold. For at least some embodiments a request for acknowledgment would be transmitted. However, for this embodiment, a time delay is introduced before the controller 960 transmits the request for acknowledgment. Here, an aggregated acknowledgement notice is received from the base station. Based on the aggregated acknowledgement notice which includes a bitmap that indicates successfully received packets, the controller 960 of the hub purges the local buffer 911 of the successfully received packets. As shown at time t3, the local buffer **91*l* includes fewer packets than the threshold after the controller 960 has purged the successfully received packets. Therefore, controller 960 of the hub does not send of transmit the request for acknowledgement which further reduces demands on the wireless channel resources. As shown, packets 2-8 are indicated as successfully received by the base station. Therefore, the controller 960 purges these packets from the local buffer 911**.

For an embodiment, the base station (receiving device) transmits aggregated acknowledgment notifications on a routine, static, periodic basis (for example, once every 10.24 seconds (a time duration of a frame)). For an embodiment, as the number of wireless devices and thus acknowledgments increase, the base station sends (transmits) additional acknowledgment notifications in the interstitial time periods (for example, every 5.12 second or 2.56 seconds (that is, multiple times per frame).

For an embodiment, the time delay used by each modem is greater than or equal to the currently configured acknowledgement notification period. As the acknowledgement notification period increases, the time delay accordingly increases.

Figure 11:
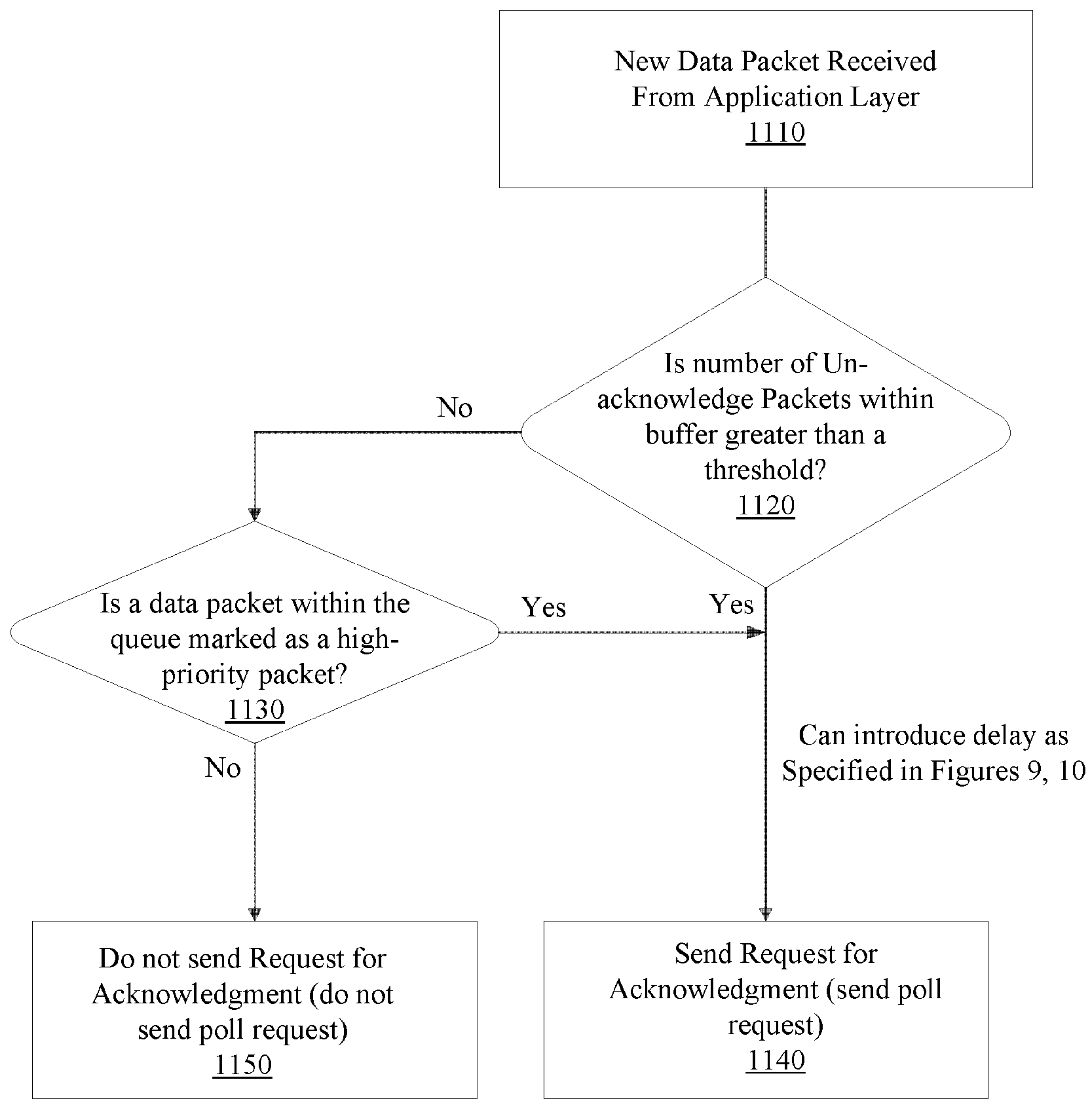
FIG. 11 is a flow chart that includes steps of a method of dynamically controlling a local buffer or a radio link layer of a transmitting modem, according to an embodiment.

FIG. 11 is a flow chart that includes steps of a method of dynamically controlling a local buffer of a radio link layer of a transmitting modem, according to an embodiment. A first step 1110 includes the modem of a hub receiving one or more data packets for transmission to a base station. For an embodiment, the one or more data packets are received from an application layer. The transmission packets are stored in the local buffer of the modem. A second step 1120 includes a controller of the modem determining whether the number of transmission packets stored in the local buffer exceeds a threshold. If the number of transmission packets stored in the local buffer does exceed the threshold, then a step 1140 includes the transmitting modem sending (transmitting) a request for acknowledgement of reception of the transmission packets to a receiving device (base station). As previously described, for an embodiment, a time delay is introduced by the modem before transmitting the request for acknowledgement as shown in FIGS. 9 and 10. Further, a step 1130 includes the controller of the modem determining whether any of the data (transmission) packets within the local buffer of the modem is a high-priority packet. If none of the transmission packets within the local buffer are high-priority packets and the number of packets within the local buffer is less than the threshold, then the controller of the modem determines (step 1150) not to send (transmit) a request for acknowledgement.

FIG. 12 is a flow chart that includes steps of a method of dynamically controlling a local buffer of a modem, according to an embodiment. A first step 1210 includes receiving and queuing transmission packets in the local buffer of the modem of the wireless device for wireless transmission to a receiving device. A second step 1220 includes purging each transmission packet from the local buffer after receiving an acknowledgement of reception of the transmission packet from a radio link layer of the receiving device. A third step 1230 includes requesting acknowledgement from the receiving device when a queue of the transmission packets within the local buffer exceeds a threshold level. A fourth step 1240 includes aggregating, by the receiving device, acknowledgment responses to a plurality of unpurged transmission packets in the local buffer and transmitting an aggregated acknowledgment to the modem.

For an embodiment, the aggregated acknowledgement includes responses to requested acknowledgements over time. For an embodiment, the local buffer receives packets for transmission over time, and accordingly fills the local buffer with transmission packets. The request for acknowledgement will typically occur with more than one packet in the local buffer. Accordingly, the aggregated acknowledgement will include responses to requested acknowledgements over time.

At least some embodiments further include requesting acknowledgement for the plurality of unpurged transmission packets in the local buffer from the receiving device when the queue of the transmission packets within the local buffer includes a high-priority packet. For an embodiment, high-priority packets that are time sensitive packets that need to be communicated more quickly than non-high-priority packets. For an embodiment, the high priority packet is identified by a priority tag received from an application.

For at least some embodiments, the aggregated acknowledgments include an index of a last transmission of sequential transmission packets before a packet drop occurred. For an embodiment, the local buffer includes N possible transmission packet, wherein each packet can be represented by an index that includes N possible indices. For an embodiment, the transmission packets are temporally transmitted according to the index numbers. For an embodiment, the aggregated acknowledgement includes the index (if buffer contains 10 packets (1,2,3 . . . 10) and packet 6 was dropped, therefore last successful packet index is 5) of the last transmission of sequential packets before a packet drop occurred. Based on the last successful packet, the controller of the modem can purge the local buffer of the successfully received packets.

For at least some embodiments, the aggregated acknowledgment includes a bitmap index, wherein the bitmap index includes indications of successful or non-successful reception of transmission packets of the local buffer. That is, each bit of the bitmap index represents a one of the transmission packets within the local buffer. If the local buffer can hold N packets, then the bitmap includes N bits. Based on the bitmap index received through the aggregated acknowledgement, the controller of the modem of the hub is able to determine which transmission packets of the local buffer to purge.

For at least some embodiments, the aggregated acknowledgment includes an identification code of the wireless device(s) that requested acknowledgement. That is, the aggregated acknowledgement can include acknowledgement of reception of transmission packets from multiple transmitting devices (hubs). Accordingly, each hub must be able to identify which of the acknowledgements of the aggregated acknowledgement are intended for the hub receiving the aggregated acknowledgment.

For at least some embodiments, the buffer of the modem is included within one of a plurality of hubs, wherein the receiving device is a base station, and wherein the base station aggregates acknowledgement responses to the plurality of hubs and wirelessly transmits the aggregated acknowledgement to the plurality of hubs. That is, as previously stated and inferred, multiple transmitting devices (hub) transmit request for acknowledgement of the packets within the local buffers of each of the transmitting devices. For an embodiment, the base station aggregates responses to the request for acknowledgement of the multiple hubs over time and generates a single aggregated response that include responses to the multiple hubs over time. The aggregated response to wirelessly transmitted, and the multiple hubs receive the aggregated response. Each hub identifies the response for the hub based on a hub ID included within the aggregated response. Further, each hub identifies the successfully receive packets based on, for example, a bitmap within the aggregated response that identifies the successfully received packets. For an embodiment, the aggregated acknowledgement to the plurality of hubs is transmitted within a multicast packet.

As shown in FIGS. 9 and 10, an embodiment further includes time delaying the requesting of the acknowledgement after the buffer threshold has been reached. That is, the acknowledgement request from the transmitting device occurs after a time delay from when the local buffer threshold is reached. This extra wait time allows an aggregated acknowledgement notice of the base station the opportunity to allow for purging of the queue of packets within the local buffer before the transmitting devices puts in its normal request for acknowledgement. For an embodiment, the receiving device (can be periodically) transmits aggregated notifications to the plurality of hubs, wherein the aggregated notification includes a plurality of acknowledgments (for example, multiple bitmaps, multiple last indices, multiple cumulative success Boolean bits) for a plurality of hubs. That is, the aggregated notifications indicate whether transmission packets were successfully received before the transmitting wireless device has requested an acknowledgement response.

As previously described, for an embodiment, the radio link layer of the wireless device dynamically controls the local buffer. Further, as previously described, the local buffer maintains a window of unacknowledged packets. It is to be understood that the packets within the local buffer may or may not have been transmitted. For an embodiment, the radio link layer receives the packets from an upper layer of the wireless device. For an embodiment, the radio link layer receives the packets from an application.

For an embodiment, the previously described priority tag reflects a time urgency of the packet. For an embodiment, a priority tag implies a latency SLA (service level agreement), and priority tags can also be used to ensure packets arrive at the base station in the order that they were sent in.

An embodiment further includes requesting acknowledgement from the receiving device when no acknowledgement request has been sent for a certain period of time, At least some embodiments further include appending aggregated acknowledgements of transmission packets by the receiving device (base station) for any unacknowledged transmission packets of the local buffer anytime the receiver transmits a packet to the wireless device. It is to be understood that the aggregated acknowledgment could be in the form of a notice or a response. For example, Device A (transmitter), may have 3 low priority packets in its local buffer. However, because buffer is not full (does not exceed the threshold) and local buffer does not contain a high priority packet and a prescribed period of time has not elapsed yet, Device A has NOT requested an Acknowledgment from the receiver (Device B). Meanwhile Device B (receiving device) has initiated an independent message transmission from Device B to Device A. Because Device B is aware of the unacknowledged messages it has received from Device A, device B can append those acknowledgments to its otherwise unrelated original message contents.

An embodiment includes determining by the wireless device (transmitter) not to request an acknowledgment if the buffer threshold has not been reached, or if the buffer does not contain a high priority packet. That is, the controller of the modem proactively determines not to transmit the request for acknowledgment.

An embodiment further includes aggregating, by the wireless device, unacknowledged transmission packets within the local buffer, and transmitting the aggregated unacknowledged transmission packets to the receiving device within a single aggregated packet.

Referring to FIG. 1, for an embodiment, the base station 140 receives uplink wireless communication from each of the plurality of hubs 110, 190 according to the data profile of each of the hubs 110, 190 and according to the scheduled communication. For an embodiment, the hubs 110, 190 use the data profiles 122, 124 for determining when to transmit, and the base station 140 uses the scheduled communication to determine when to receive the uplink wireless communication.

For an embodiment, after the time period of the scheduled communication, the base station 140 simultaneously broadcasts acknowledgements of reception of the uplink wireless communication from each of the plurality of hubs 110, 190. That is, the simultaneously broadcast acknowledgement includes acknowledgments directed to each of the individual hubs 110, 190 and indicates whether the scheduled uplink communication received from each of the individual hubs 110, 190 was successfully received. Each of the individual hubs 110, 190 can determine whether its uplink wireless communication was successfully received based on reception of the broadcast acknowledgement. That is, each of the hubs 110, 190 determine whether the uplink wireless communication was successful based on the simultaneously broadcast acknowledgements, wherein reception of the simultaneously broadcast acknowledgements by each hub is facilitated by the data profile of the hub. For an embodiment, the hub utilized the periodicity, the offset, and the carrier frequency within the data profile to determine or identify acknowledgements of uplink communication of the hub to the base station.

For an embodiment, the broadcast acknowledgement originates at the server 150. For an embodiment, the broadcast acknowledgement originates at the base station 140.

By including the acknowledgments of many hubs within a single broadcast acknowledgement rather than generating a separate transmitted acknowledgment for each individual hub saves wireless communication air-time. This becomes more and more true as the number of hubs increases.

As shown, for an embodiment, the uplink wireless communication is transmitted by plurality of hubs and received by the base station through a satellite wireless link via a satellite 191, and the base station simultaneously broadcasts the acknowledgements through the satellite wireless link.

Figure 13:
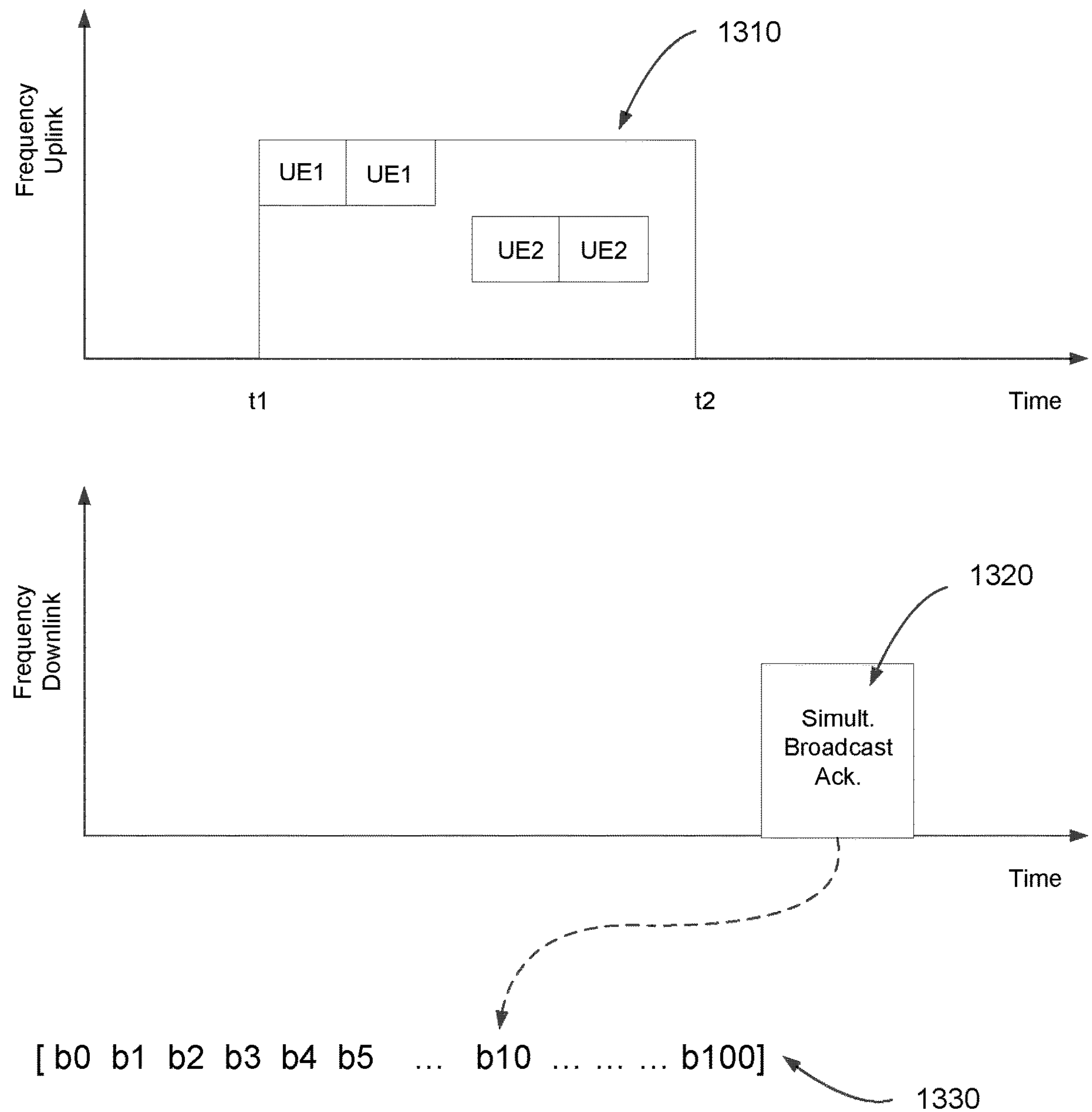
FIG. 13 shows uplink and downlink frames of wireless communication, according to an embodiment.

FIG. 13 shows uplink and downlink frames 1310, 1320 of wireless communication, according to an embodiment. The scheduled communication includes uplink communication allocations for each of the hubs 110, 190. As shown, the uplink frame includes uplink wireless communication allocations for a hub1 and a hub2 at different time and frequency slots within the uplink frame 1310.

For an embodiment, the data profile for each hub includes at least one time and frequency slot for uplink communication of the hub. For an embodiment, the data profile for the hub further includes at least one time and frequency slot for reception of broadcast acknowledgments the hub. That is, not only does the data profile provide the hub with the schedule of uplink wireless communication, the data profile includes scheduling of the downlink broadcast acknowledgements. For an embodiment, the acknowledgements can be extracted by hub from the simultaneous broadcast acknowledgement 1320 by using the schedule (provided as part of user-profile) used by hub for uplink communication.

Further, for an embodiment, the hub determines which of one or more bits of a received broadcast acknowledgement packet within the simultaneous broadcast acknowledgement of the downlink frame 1320 includes acknowledgment information of the hub based on the scheduled time and frequency slots for uplink communication of the hub. For example, as shown, a packet 1330 within the simultaneous broadcast acknowledgement of the downlink frame 1320 includes the acknowledgement information of each of the plurality of hubs. Each hub can determine which bit(s) of the packet 1330 within simultaneous broadcast acknowledgement of the downlink frame 1320 includes the acknowledgement information direction to the hub based on the information within the data profile of the hub, or based on the time and frequency slot the hub used in its uplink wireless communication. For an embodiment, the location of acknowledgement for uplink communication during a specific time slots-subcarrier within simultaneous broadcast acknowledgement can be determined by user device using the schedule (for example, timeslot and sub-carrier frequency) used for uplink transmission.

As previously described, for an embodiment, the scheduled communication that is provided to the base station includes time slots and carrier frequencies, and includes an allocation of at least some of the time slots and subcarrier frequencies. That is, at least some of the time and frequency slots are allocated by the scheduled communication provided to the base station by the server. For an embodiment, the scheduled communication includes sub-frames. For a specific embodiment, a sub-frame includes 1 millisecond timeslot as specified NB-IOT (Narrow-Band Internet of Things) standards. For an embodiment, the scheduled communication includes user information (such as, user identity), data transmission mode and connection related information for the user for which 'timeslots and sub-carrier frequencies' (resource units) are allocated.

For at least some embodiment, the base station receives the scheduled communication in the form of allocated time and frequency slots, and the base station further allocates additional time slots and carrier frequencies. For an embodiment, the further allocating includes the receiving, by the base station, subsequent requests and demands that the base station adapts and infills the additional time slots and carrier frequencies. For an embodiment, the base station receives a time period that is allocated to the base station, and the base station then selects time slots and sub-carriers within the time period for the scheduled communication.

For at least some embodiments, the base station receives the uplink communication from the hubs, and collects acknowledgements for scheduled uplink communication in a hyper frame/radio frame/subframe (or a fixed time duration) and sub-carrier frequency range, and creates a broadcast packet (the simultaneously broadcast acknowledgements). For an embodiment, the base station then broadcasts the broadcast/multicast packet (the simultaneously broadcast acknowledgements) at a set time delay from completion of a time window used for collection of acknowledgements of the scheduled uplink communication. This broadcast includes acknowledgement of receiving packets (the uplink communication) successfully in a frequency and time slot within the given time window.

For an embodiment, the data profile of the user device facilitates reception of the simultaneously broadcast acknowledgements through at least an acknowledgement period and an acknowledgement offset included within the data profile of the hub that allows the hub to determine when to receive simultaneously broadcast acknowledgements of uplink wireless communication of the hub.

For an embodiment, each simultaneously broadcast acknowledgement includes acknowledgement information of a plurality of hubs that transmitted uplink wireless communication within a corresponding period of time t2-t1, and frequency (subcarrier) allocation. For an embodiment, this includes timeslot within subcarrier allocations within the t2-t1 time duration, wherein the subcarrier allocation may or may not be continuous within a range of subcarriers, and the time slots may or may not by continuous in time, forming a checker board of time slots and subcarrier frequencies within the t2-t1 time duration.

For an embodiment, the simultaneously broadcast acknowledgements include simultaneously multicast acknowledgements, wherein an acknowledgment for each of the user devices within the simultaneously multicast acknowledgements include a code that a corresponding set of hubs can decode. For an embodiment, hubs with acknowledgements in simultaneous multicast acknowledgement share a code to decode the simultaneous multicast acknowledgement. For an embodiment, the code for multicast acknowledgements is provided with the data profiles. For an embodiment, the code includes a scrambling code.

For an embodiment, the acknowledgment for each of the hub within the simultaneously broadcast acknowledgements provides an acknowledgment to the hub for uplink wireless communication within a specified number of time slots and carrier frequencies.

For an embodiment, the data profile includes the periodicity, offset, and carrier frequency for the uplink wireless communication, and an acknowledgement periodicity, and an acknowledgement offset of acknowledgements of the uplink wireless communication within the simultaneously broadcast acknowledgements. For an embodiment, the data profiles also include a transmission mode, which can include RRC (Radio Resource Control) message type and data transmission mode for uplink wireless communication.

Although specific embodiments have been described and illustrated, the embodiments are not to be limited to the specific forms or arrangements of parts so described and illustrated. The described embodiments are to only be limited by the claims.

What is claimed:

1. A method of dynamically controlling a local buffer of a modem of a wireless device, comprising:

receiving transmission packets in the local buffer of the modem of the wireless device for wireless transmission to a receiving device;

purging each transmission packet from the local buffer after receiving an acknowledgement of reception of the transmission packet from the receiving device;

requesting acknowledgement from the receiving device when a queue of the transmission packets within the local buffer exceeds a threshold level, and when the queue of the transmission packets within the local buffer includes a high priority packet;

wherein a time delay is introduced before the requesting of the acknowledgement, wherein the time delay is based at least on a propagation delay of the wireless transmission between the wireless device and the receiving device; and wherein the receiving device aggregates acknowledgment responses to a plurality of unpurged transmission packets in the local buffer and transmits an aggregated acknowledgment to the modem.

2. The method of claim 1, wherein the aggregated acknowledgement includes responses to requested acknowledgements over time.

3. The method of claim 1, wherein the time delay is further based on a timing of scheduled multicast transmission.

4. The method of claim 3, wherein the high priority packet is identified by a priority tag received from an application.

5. The method of claim 4, wherein the priority tag reflects a time urgency of the packet.

6. The method of claim 1, wherein the aggregated acknowledgment includes an index of a last transmission of sequential transmission packets before a packet drop occurred.

7. The method of claim 1, wherein the aggregated acknowledgment includes a bitmap index, wherein the bitmap index includes indications of successful or non-successful reception of transmission packets of the local buffer.

8. The method of claim 1, wherein the aggregated acknowledgment includes an identification code of the wireless device that requested acknowledgement.

9. The method of claim 1, wherein the buffer of the modem is included within one of a plurality of hubs, wherein the receiving device is a base station, and wherein the base station aggregates acknowledgement responses to the plurality of hubs and wirelessly transmits the aggregated acknowledgement to the plurality of hubs.

10. The method of claim 9, further comprising transmitting, by the base station, the aggregated acknowledgement to the plurality of hubs within a multicast packet.

11. The method of claim 1, wherein the threshold level is dynamically adjustable over time based on network conditions of the wireless device.

12. The method of claim 11, wherein the receiving device transmits aggregated notifications to a plurality of hubs, wherein the aggregated notification includes a plurality of acknowledgments for a plurality of hubs.

13. The method of claim 12, wherein the aggregated response includes a Boolean array that indicates reception and acknowledgment of all packets in the local buffer of the wireless device.

14. The method of claim 12, further comprising each hub purging its local buffer of packets acknowledged by the aggregated acknowledgement.

15. The method of claim 1, further comprising requesting acknowledgement from the receiving device when no acknowledgement request has been sent for a certain period of time.

16. The method of claim 1, further comprising appending the aggregated acknowledgement of transmission packets by the receiving device for any unacknowledged transmission packets of the local buffer anytime the receiver transmits a packet to the wireless device.

17. The method of claim 1, further comprising determining by the wireless device not to request an acknowledgment if the buffer threshold has not been reached, or if the buffer does not contain a high priority packet.

18. The method of claim 1, further comprising:

aggregating, by the wireless device, unacknowledged transmission packets within the local buffer; and transmitting the aggregated unacknowledged transmission packets to the receiving device within a single aggregated packet.

19. A modem of a wireless device, comprising:

a local buffer;

an RF wireless communication chain;

a controller, the controller operative to:

receive and queue packets in the local buffer for wireless transmission through the RF wireless communication chain to a receiving device;

purge each transmission packet from the local buffer after receiving an acknowledgement of reception of the transmission packet from the receiving device;

request acknowledgement from the receiving device when a queue of the transmission packets within the local buffer exceeds a threshold level, and when the queue of the transmission packets within the local buffer includes a high priority packet;

wherein a time delay is introduced before the request of the acknowledgement, wherein the time delay is based at least on a propagation delay of the wireless transmission between the wireless device and the receiving device; and the receiving device is operative to aggregate acknowledgment responses to a plurality of unpurged transmission packets in the local buffer and transmits an aggregated acknowledgment to the modem.

20. A wireless system, comprising:

a base station comprising a receiver;

a hub operative to report information to the base station, the hub comprising:

a local buffer;

an RF wireless communication chain; and a controller, the controller operative to:

receive and queue packets in the local buffer for wireless transmission through the RF wireless communication chain to the base station;

purge each transmission packet from the local buffer after receiving an acknowledgement of reception of the transmission packet from the base station;

request acknowledgement from the base station when a queue of the transmission packets within the local buffer exceeds a threshold level, and when the queue of the transmission packets within the local buffer includes a high priority packet;

wherein a time delay is introduced before the request of the acknowledgement, wherein the time delay is based at least on a propagation delay of the wireless transmission between the hub and the base station; and the base station operative to aggregate acknowledgment responses to a plurality of unpurged transmission packets in the local buffer and transmits an aggregated acknowledgment to the hub.

* * * * *